United States Patent [19]

Nelson

[11] Patent Number: 5,577,784
[45] Date of Patent: Nov. 26, 1996

[54] VEHICLE BUMPER

[75] Inventor: Gullmar V. Nelson, Durham, N.H.

[73] Assignee: Davidson Textron Inc., Dover, N.H.

[21] Appl. No.: 299,274

[22] Filed: Sep. 1, 1994

[51] Int. Cl.⁶ .................................................. B60R 19/18
[52] U.S. Cl. ........................................ 293/120; 293/121
[58] Field of Search .................................. 293/102, 120, 293/121, 155; 296/188

[56] References Cited

U.S. PATENT DOCUMENTS

| | | | |
|---|---|---|---|
| 3,574,379 | 4/1971 | Jordan | 293/120 |
| 3,690,710 | 9/1972 | Curran | 293/120 |
| 3,827,740 | 8/1974 | Golze et al. | 293/120 |
| 4,354,700 | 10/1982 | Goupy et al. | 293/132 |
| 4,391,464 | 7/1983 | Masotti et al. | 293/120 |
| 4,597,601 | 7/1986 | Manning | 293/122 |
| 4,715,630 | 12/1987 | Manning | 293/120 |
| 4,733,894 | 3/1988 | Lamparter | 293/120 |
| 4,941,701 | 7/1990 | Loren | 293/155 |
| 5,096,243 | 3/1992 | Gembinski | 293/120 |
| 5,154,462 | 10/1992 | Carpenter | 293/120 |

*Primary Examiner*—Dean Kramer
*Attorney, Agent, or Firm*—Reising, Ethington, Barnard & Perry

[57] ABSTRACT

A vehicle bumper system includes a structural reaction injected molded (SRIM) bumper beam that has a hollow body of generally C-shaped cross section and a SRIM reinforcement leaf that is attached to the front wall of the hollow body to increase the damage free impact resistance of the SRIM bumper beam. The reinforcement leaf can be separately molded and bonded to a front wall of the hollow body by a resilient adhesive or molded as an integral part of the hollow body. In the latter case, the integral reinforcement leaf can be solidly attached or it can be attached at the perimeter with its center separated from the front wall of the hollow body by an intervening layer of resilient material. An energy absorber pad of resilient foam material may be attached to a face of the front wall of the hollow body for increasing damage free impact resistance.

6 Claims, 2 Drawing Sheets

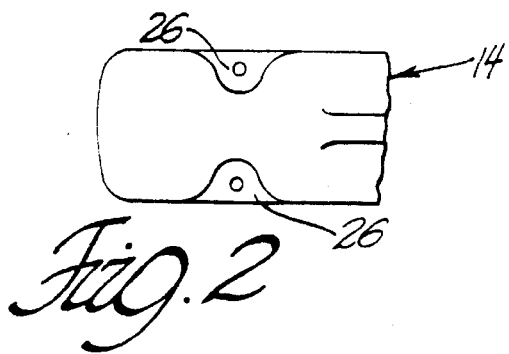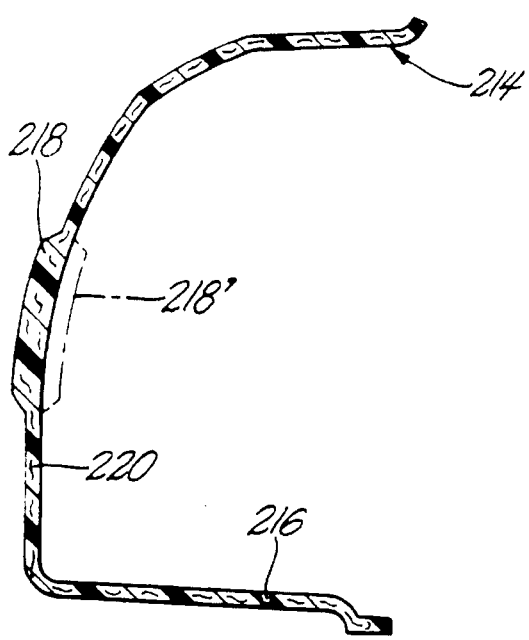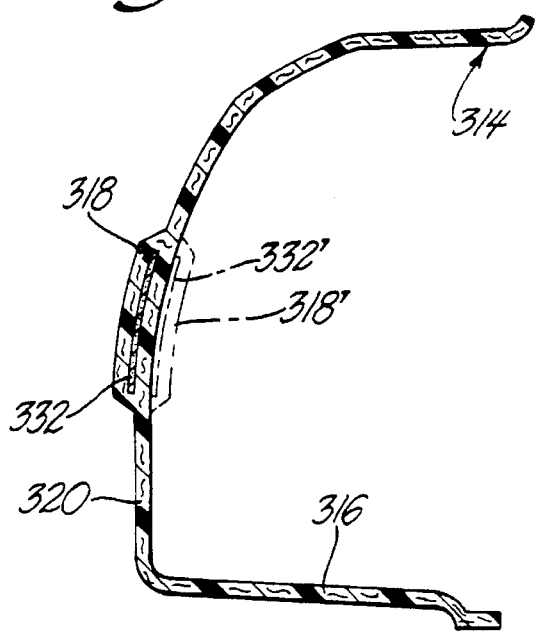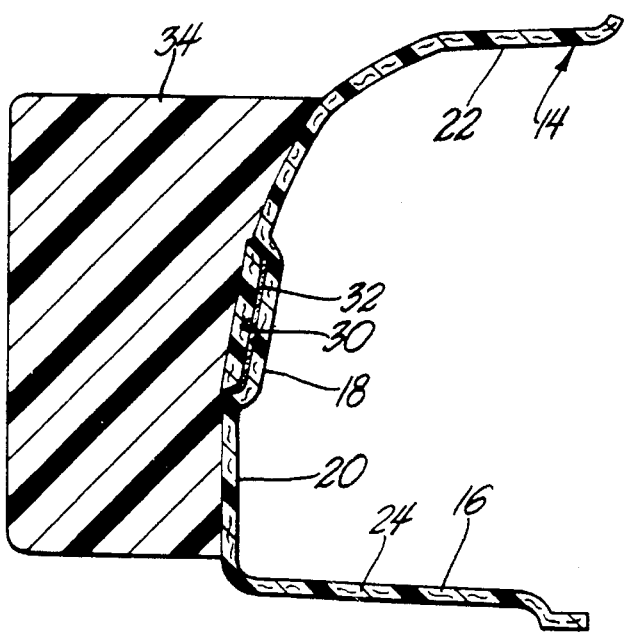

5,577,784

VEHICLE BUMPER

BACKGROUND OF THE INVENTION

This invention relates to vehicle bumpers and more particularly to energy absorbing vehicle bumpers that manage moderate impact forces without incurring damage to the vehicle bumper or to the vehicle to which it is attached.

An early approach to energy absorbing vehicle bumpers used a relatively stiff steel beam attached to the vehicle body structure by hydraulic shock absorbers. These shock absorbers collapsed to absorb the energy of bumper impact forces and then recovered to return the bumper to its original state and position. Such systems are generally regarded as being complicated, expensive and design restrictive.

Another known approach uses a relatively stiff steel beam rigidly attached to the vehicle body structure and an energy absorber in the form of a resilient foam pad attached to a face of the stiff steel beam. These systems require manufacture and attachment of resilient foam pads which is time consuming and costly Still another known approach uses a molded structural beam of high strength plastic that is rigidly attached to the vehicle structure and that absorbs impact energy by resiliency of the beam itself.

One such system is disclosed in U.S. Pat. No. 4,941,701 granted to Norman S. Loren Jul. 17, 1990 for a vehicle bumper comprising an impact energy managing bumper structure made of injection molded plastic that is secured to column rails of the vehicle body structure. The bumper structure comprises a beam of generally C-shaped cross section that has channels, buckling columns, horizontal and vertical ribs and specially formed mounting portions for managing impact energy. The bumper structure may include additional energy management inserts or additional energy managing material such as plastic foam. Moreover, the beam may include hollow portions that increase its resistance to deformation and displacement thereby contributing to its ability to dissipate impact forces. While this system may be suitable for its intended purpose, it requires the molding of complicated shapes which is time consuming and costly.

Another such system approach is disclosed in the U.S. Pat. No. 5,096,243 granted to John C. Gembinski Mar. 17, 1992. The Gembinski bumper assembly comprises a rigid support member, a outer shell or skin and an energy absorbent material contained within a cavity between the rigid support member and the outer shell. The support member includes a plurality of elongated box sections which consist essentially of wrapped fiber having interstices filled with resin. More specifically a core member of low density foam filler such as styrene beads is wrapped with a high strength fiber such as carbon, Aramid, polyester, or glass fiber. The wrapped core material is disposed in a cavity of a reaction injection mold and resin, such as urethane, polyester, nylon, epoxy or acrylic is injected into the mold to fill the interstices of the porous reinforcement material to form a structural reaction injected (SRIM) beam. While this system may also be suitable for its intended purpose, it likewise requires the molding of complicated shapes which is time consuming and costly.

SUMMARY OF THE INVENTION

The object of this invention is to provide an energy absorbing vehicle bumper that does not require a separate energy absorber such as mechanical shock absorbers or resilient foam pads.

Another object of this invention is to provide an energy absorbing vehicle bumper that uses a resiliently deformable bumper beam of high strength plastic that is simply shaped so that complicated and costly molding procedures are avoided.

Another object of this invention is to provide an energy absorbing vehicle bumper of the above type that is reinforced to increase its energy absorbing capacity easily and economically.

A feature of the invention is that the reinforced plastic bumper beam is very compact so that it requires very little space between the vehicle body structure and the vehicle body fascia.

Another feature of the invention is that the reinforced plastic bumper beam is very compact so that it is relatively easy to package in the vehicle.

Still another feature of the invention is that the bumper beam acts like a leaf spring having a structural beam-like body that absorbs part of the impact energy and an attached reinforcement leaf that absorbs part of the impact energy.

In one aspect, another feature of the invention is that the natural shape of the bumper beam is advantageously used to attach a reinforcement leaf.

In another aspect another feature of the invention is that the molding process for the bumper beam is advantageously used to attach a reinforcement leaf.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2 is a front view of an end portion of the reinforced bumper beam shown in FIG. 1;

FIG. 5 is a cross section of still another embodiment of a reinforced bumper beam in accordance with the invention;

FIG. 6 is a cross section of yet another embodiment of a reinforced bumper beam in accordance with the invention; and FIG. 7 is a cross section of still yet another embodiment of a reinforced bumper beam in accordance with the invention.

DESCRIPTION OF THE INVENTION

Figure 1:
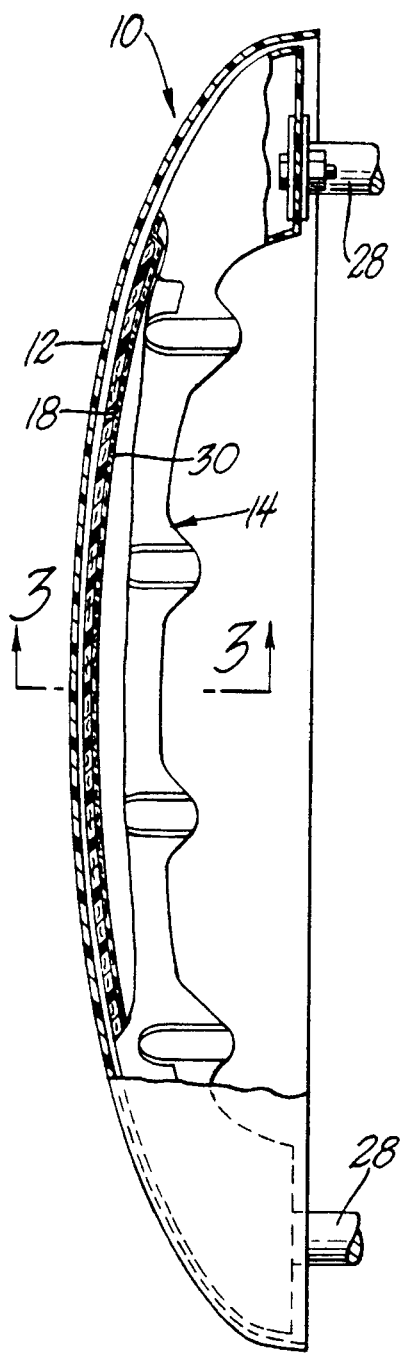
FIG. 1 is a partially sectioned top view of a bumper system having a reinforced energy absorbing bumper beam in accordance with the invention.
Figure 3:
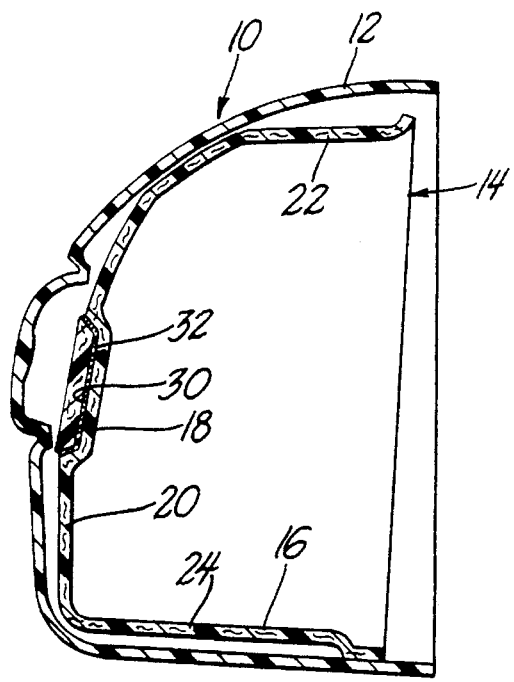
FIG. 3 is an enlarged cross section taken substantially along the line 3—3 of FIG. 1 looking in the direction of the arrows.

Referring now to the drawing, FIGS. 1, 2 and 3 show a bumper system 10 comprising a resiliently deformable plastic facia 12 and a reinforced energy absorbing bumper beam 14 of the invention. The beam 14 comprises a molded hollow body 16 of high strength plastic material and a separately molded reinforcement leaf or strip 18 that is attached to the hollow body 16 to increase the ability of the energy absorbing bumper beam 14 to absorb impact force without incurring any damage.

The hollow body 16 is generally C-shaped in cross section having a front wall 20 that is integrally joined to a top wall 22 and a bottom wall 24. The hollow body 16 has pinch-like indents near each end that provide vertically spaced end flanges 26 that are used to bolt the beam 14 to laterally spaced frame rails 28 of the vehicle body structure as shown in FIGS. 1 and 2.

The front wall 20 is convex in lateral or the cross car direction as shown in FIG. 1. The medial portion of the front wall 20 has a lateral conformation in the form of an indent that forms a forward facing lateral groove 30 as shown in FIG. 1 and 3. The lateral groove 30 extends for about the middle seventy percent (70%) of the width of the front wall 20 of the hollow body 16 as shown in FIG. 1. It is about midway between the upper and lower walls 22 and 24 of the generally C-shaped body 16 as shown in FIG. 3.

The lateral groove 30 increases the torsional stiffness of the C-shaped body 16 particularly the front wall 20. The lateral groove 30 also provides a convenient structure that is advantageously used for attaching the reinforcement leaf 18.

The reinforcement leaf 18 is concavo-convex in the lateral or cross car direction and matches the shape of the groove 18. The reinforcement leaf 18 is centered in the lateral groove 30 and bonded to the front face 20 of the hollow C-shaped body 16 with a resilient adhesive 32. The resilient adhesive 32 allows limited relative movement between front face 20 and the reinforcement leaf when the reinforced bumper beam 14 deflects and distorts to absorb energy in response to impact forces. An example of a suitable resilient adhesive is 3M 3532 B/A urethane adhesive which is a product of the Minnesota Mining and Manufacturing Co.

The hollow generally C-shaped body 16 of the reinforced bumper beam 14 is preferably made by fabricating a porous reinforcing mat, generally in the form of short glass fibers, to the desired shape of the body 16. This may be done in a variety of ways, for instance by thermoforming fiberglass mats or by using the directed fiber preforming process that is disclosed in U.S. Pat. No. 5,217,672 granted to Josh Kelman Jun. 8, 1993.

The preformed reinforcing mat is then placed in a mold. The mold is closed and then a very low viscosity resin, such as Dow MM310 available from the Dow Chemical Company of Midland, Mich. or Miles BB 400 IMR available from Miles, Inc. of Pittsburgh, Pa. Dow MM310 or Miles MBB 400 IMR is injected into the closed mold to thoroughly impregnate the porous preformed mat and form the hollow generally C-shaped beam 16 when it cures. This provides a very strong beam of high strength reinforced plastic that is generally referred to as a structural reaction injection molded or SRIM beam.

The reinforcement leaf 18 is preferably made in the same way with a preformed reinforcing mat and a very low viscosity resin which may be the same resin as that used in the body 16.

As indicated above the reinforcement leaf 18 is then bonded in the groove 30 in the front wall 20 of the hollow body 16 with a resilient adhesive to form the reinforced bumper beam 14. When impacted in a vehicle collision, the reinforced bumper beam 14 acts like a leaf spring with the resiliency of the hollow body 16 absorbing part of the impact energy and the resiliency of the reinforcement leaf 18 absorbing part of the impact energy. Thus the presence of the reinforcement leaf increases the ability of the bumper beam 14 to absorb energy without sustaining any damage. This in turn increases the impact velocity that the reinforced bumper beam 14 can withstand without damage in a front or rear end collision.

In this regard, I have found that the reinforced beam 14 can withstand appreciably higher impact velocities without damage if the reinforcement leaf 18 extends for at least about the middle fifty percent (50%) of the width of the beam body 16 where the deflection of the beam body 16 and the reinforcement leaf 18 is the highest. On the other hand there does not appear to be any advantage in extending the reinforcement leaf for more than about the middle seventy percent (70%).

The hollow body 16 is of substantially uniform thickness and consequently it can be molded quickly and economically since substantially the entire body cures at the same time. The reinforcement leaf 18 is also of substantially uniform thickness and consequently it enjoys the same manufacturing advantage.

Another advantage of the reinforced energy absorbing bumper beam 14 is that a variety of preform architectures can be used for the reinforcement mats to tailor the performance of the bumper beam components. Moreover, the spring action can take a number of different forms.

Figure 4:
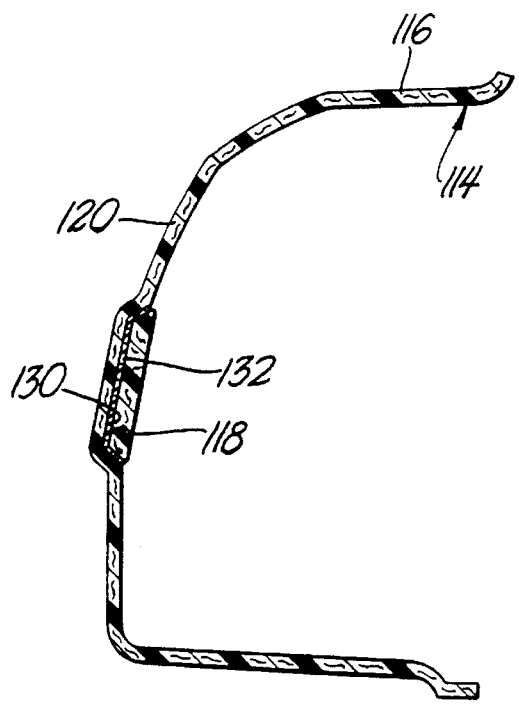
FIG. 4 is a cross section of another embodiment of a reinforced bumper beam in accordance with the invention.

For instance, FIG. 4 is a cross section of an alternative in which the hollow body 116 of the reinforced bumper beam 114 has a front wall 120 that has a forward lateral protrusion that forms a rearward facing lateral groove 130. The lateral groove 130 also extends for about the middle seventy percent (70%0) of the width of the hollow body 116 and it is still about midway in the vertical direction. The reinforcement leaf 118 is still the same length as the reinforcement leaf 18 but it is shaped to match the central portion of the lateral groove 130.

The reinforcement leaf 118 is also concavo-convex in the cross car direction and it is centered in the lateral groove 130 and bonded to the hollow body 116 with a resilient adhesive 132 of the same type used in the earlier embodiment.

The reinforced bumper beam 114 is preferably made in the same way as the reinforced bumper beam 14.

FIG. 5 is a cross section of another alternative of the invention in which the reinforcement leaf 218 is molded as a solid integral part of the hollow generally C-shaped body 216 of the reinforced bumper beam 214. The reinforcement leaf 218 may be formed as an integral forward protrusion of front wall 212 as shown in solid line in FIG. 5, or as an integral rearward protrusion 218' as shown in phantom, or a combination of both. This alternative is less expensive than the embodiments shown in FIGS. 1, 2 3 and 4 because the body 216 and leaf reinforcement 218 are molded simultaneously using an integrated reinforcement mat. However, there is not any provision for relative movement between the beam body 216 and the reinforcement leaf 218 when the bumper beam 214 is deflected. Consequently the bumper beam 214 does not have as much damage free energy absorption capacity at the bumper beam 14 or 114.

FIG. 6 is a cross section of yet another alternative of the invention in which a resilient material such as a thin foam tape layer 332 is included in a composite reinforcement mat for the reinforced bumper beam 314. This tape layer 332 partially separates the integrally molded reinforcement leaf 318 from the front wall 320 of the beam body 316 when the mat is injected with a resin and cured in a reaction injection molding operation. In such a case the perimeter of the reinforcement leaf 318 may be integrally attached to the front wall 320 while the central portion is separated by the tape layer 332 as shown in FIG. 6. Moreover the reinforcement leaf 318 may be formed as a forward protrusion of front wall 320 as shown in solid line in FIG. 6 or as a rearward protrusion 318' partially separated by tape layer 332' as shown in phantom.

The alternative of FIG. 6 performs better than the alternative of FIG. 5 because the thin foam layer 332 or 332' allows some movement of the reinforcement leaf 318 or 318' with respect to the beam body 316 when the reinforced bumper beam 314 is deflected in response to impact. However the alternative of FIG. 6 still does not exhibit as much improvement as the bumper beam 14 or 114 but it is less expensive to manufacture though not as inexpensive as the alternative of FIG. 5.

FIG. 7 is a cross section of still yet another alternative of the invention in which an energy absorber pad 34 has been attached to the face of the reinforced bumper beam 14 that is shown and described in connection with FIGS. 1, 2 and 3. The energy absorber pad 34 is typically a low density urethane foam or expanded polypropylene bead foam, both of which have been successfully used in automotive bumper applications. The energy absorber pad 34 may be attached in any suitable manner such as by a bonding operation.

The presence of the energy absorber pad 34 increases the ability of the bumper beam 14 to absorb energy without sustaining any damage because a certain portion of the energy will be absorbed by the energy absorber pad 34. This in turn increases the impact velocity that can be withstood without damage in a front or rear end collision.

The energy absorber pad 34 may also be used in conjunction with any of the other alternatives shown in FIGS. 4, 5 and 6.

In any of the above constructions, the reinforcement leaf can be tailored to achieve optimum performance by varying the reinforcement construction and in the case of the separate reinforcement leafs shown in FIGS. 1, 2, 3 and 4, by varying the type of resin used in the reinforcement leaf.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A reinforced energy absorbing bumper beam of molded high strength plastic construction for use in a vehicle bumper comprising:

a hollow body of generally C-shaped cross section having a front wall that is integrally joined to a top wall and a bottom wall, the front wall having a lateral offset that forms a lateral groove, a reinforcement leaf that is disposed in the groove and attached to the front wall of the hollow body by a resilient adhesive to increase the thickness of the front wall and the damage free impact resistance of the beam, the hollow body being of substantially uniform thickness and the reinforcement leaf being centrally located in the groove and extending for at least about 50% of the width of the body in the lateral direction.

2. A reinforced energy absorbing bumper beam of molded high strength plastic construction for use in a vehicle bumper comprising:

a hollow body of generally C-shaped cross section having a front wall that is integrally joined to a top wall and a bottom wall, the front wall having a lateral offset that forms a lateral groove, a reinforcement leaf that is disposed in the groove and attached to the front wall of the hollow body by a resilient adhesive to increase the thickness of the front wall and the damage free impact resistance of the beam, and the front wall of the hollow body having a rearward indent that forms a forwardly facing groove.

3. A reinforced energy absorbing bumper beam of molded high strength plastic construction for use in a vehicle bumper comprising:

a hollow body of generally C-shaped cross section having a front wall that is integrally joined to a top wall and a bottom wall, the front wall having a lateral offset that forms a lateral groove, a reinforcement leaf that is disposed in the groove and attached to the front wall of the hollow body by a resilient adhesive to increase the thickness of the front wall and the damage free impact resistance of the beam, and the front wall of the hollow body having a forward protrusion that forms a rearwardly facing groove.

4. A reinforced energy absorbing bumper beam of molded high strength plastic construction for use in a vehicle bumper comprising:

a hollow body of generally C-shaped cross section having a front wall that is integrally joined to a top wall and a bottom wall, a reinforcement leaf that has a perimeter that is integrally attached to the front wall of the hollow body, and an intermediate layer of resilient material separating a central portion of the reinforcement leaf from the front wall of the hollow body.

5. The reinforced energy absorbing beam as defined in claim 4 wherein the reinforcement leaf is attached to a front face of the front wall.

6. The reinforced energy absorbing beam as defined in claim 4 wherein the reinforcement leaf is attached to a rear face of the front wall.

* * * * *